(12) United States Patent
Wang

(10) Patent No.: US 10,774,817 B1
(45) Date of Patent: Sep. 15, 2020

(54) PLANE SCROLL SPRING AND CURTAIN DRIVING DEVICE

(71) Applicant: Evelyn Yawen Wang, Rancho Palos Verdes, CA (US)

(72) Inventor: Evelyn Yawen Wang, Rancho Palos Verdes, CA (US)

( * ) Notice: Subject to any disclaimer, the term of this patent is extended or adjusted under 35 U.S.C. 154(b) by 0 days.

(21) Appl. No.: 16/425,967

(22) Filed: May 30, 2019

(51) Int. Cl.
| | |
|---|---|
| *F03G 1/02* | (2006.01) |
| *F16F 1/10* | (2006.01) |
| *E06B 9/60* | (2006.01) |
| *E06B 9/322* | (2006.01) |

(52) U.S. Cl.
CPC .............. *F03G 1/02* (2013.01); *E06B 9/60* (2013.01); *F16F 1/10* (2013.01); *E06B 9/322* (2013.01); *E06B 2009/3222* (2013.01); *F03G 2730/01* (2013.01)

(58) Field of Classification Search
CPC .......... F03G 1/02; F03G 1/08; F03G 2730/01; E06B 9/60; F16F 1/10
See application file for complete search history.

(56) References Cited

U.S. PATENT DOCUMENTS

| | | | | |
|---|---|---|---|---|
| 2,899,193 | A * | 8/1959 | Foster | F03G 1/00 267/156 |
| 4,635,755 | A * | 1/1987 | Arechaga | F03G 1/02 185/45 |
| 5,531,257 | A * | 7/1996 | Kuhar | F03G 1/02 160/168.1 P |
| 6,289,965 | B1 * | 9/2001 | Ruggles | E06B 9/322 160/170 |
| 9,038,272 | B1 * | 5/2015 | Rankin, VI | F03G 1/02 29/896.9 |
| 2005/0072635 | A1 * | 4/2005 | Toti | E06B 9/262 185/10 |
| 2016/0201389 | A1 * | 7/2016 | Oakley | E06B 9/322 160/368.1 |
| 2017/0218700 | A1 * | 8/2017 | Lin | E06B 9/382 |

* cited by examiner

*Primary Examiner* — Phillip A Johnson

(57) ABSTRACT

An embodiment of the present invention provides a plane scroll spring. A torque provided by a working section of a reed of the plane scroll spring is gradually reduced from an outer ring toward an inner ring of the plane scroll spring. The working section includes a first length section and a second length section connected to an inner end of the first length section. In the first length section, the torque decreases by a first decrement value per unit length from the outer ring toward the inner ring. In the second length section, the torque decreases by a second decrement value per unit length from the outer ring toward the inner ring. The first decrement value is less than the second decrement value.

6 Claims, 4 Drawing Sheets

PLANE SCROLL SPRING AND CURTAIN DRIVING DEVICE

BACKGROUND OF THE INVENTION

1. Field of the Invention

The present invention relates to curtain accessory technology field and, more particularly to a curtain driving device with a plane scroll spring.

2. Description of Related Art

In a cordless curtain, a drawstring connected to a curtain body is wound on the reel, and the reel can be rotated by a driving device, so that the drawstring is wound onto the reel or unwound from the reel to achieve the lifting or falling of the curtain body.

Some curtain driving devices use plane scroll springs to provide driving forces. An outer end of the plane scroll spring is wound and fixed on an intermediate shaft parallel to a central axis of the plane scroll spring, and the intermediate shaft is connected to the reel by drive connection. When the intermediate shaft rotates, the intermediate shaft will drive the reel to rotate, and vice versa. When the curtain body is to be lowered, the curtain body can be manually pulled down, and the drawstring drives the reel to rotate in the forward direction, thereby driving the intermediate shaft to rotate in the forward direction, and the reed of the plane scroll spring is wound on the intermediate shaft circle by circle. When the curtain body is to be lifted, the curtain body is pulled down slightly, the plane scroll spring will drive the reverse rotation of the intermediate shaft under its own elastic force, and at the same time, the reed will gradually withdraw from the intermediate shaft and retract the winding circle by circle, so that the intermediate shaft drives the reverse rotation of the reel to recycling the drawstring, thereby driving the curtain body to rise.

When a traditional plane scroll spring is formed, a forming radius of curvature of the reed is gradually increased from an inner ring toward an outer ring, and the smaller the radius of curvature of the reed is, the greater the torque can be provided. Therefore, the torque provided by a traditional plane scroll spring is gradually reduced from the inner ring toward the outer ring. Since the variation trend of the torque of the traditional plane scroll spring does not match the tendency of the weights of the curtain driving devices to be supported, it does not satisfactorily meet the curtain driving demand.

In another current cordless curtain, the torque provided by the plane scroll spring is gradually reduced from the outer ring toward the inner ring, which substantially matches the change in the weight of the support required for the curtain driving device. The curtain body of the curtain is preferably driven to rise and fall. However, the torque change rate of the working sections of the plane scroll spring is relatively constant, and while the rate of change of the weight required for the curtain driving device is not constant. Specifically, the higher the position of the curtain body rises, the smaller the rate of change of the weight of the curtain driving device needs to be supported. Thus, a plane scroll spring with a constant rate of torque change still affects the smoothness of driving the curtain body to lift or fall.

SUMMARY OF THE INVENTION

Therefore, the technical problem to be solved by the embodiments of the present invention is to provide a plane scroll spring, which can provide a torque of different rate of change in different working sections.

The technical problem to be further solved by the embodiments of the present invention is to provide a curtain driving device, which provides smooth support during the lifting or falling process of the curtain.

To solve the above-mentioned technical problems, an embodiment of the present invention provides a plane scroll spring; a torque provided by a working section of a reed of the plane scroll spring is gradually reduced from an outer ring toward an inner ring of the plane scroll spring; the working section includes a first length section and a second length section connected to an inner end of the first length section; in the first length section, the torque decreases by a first decrement value per unit length from the outer ring toward the inner ring; in the second length section, the torque decreases by a second decrement value per unit length from the outer ring toward the inner ring; the first decrement value is less than the second decrement value.

Furthermore, a flat outer fixing section is formed on a starting end of an outermost reed of the working section.

Furthermore, an inner fixing portion is formed on an inner end of the reed of an innermost ring of the working section.

On the other hand, an embodiment of the present invention provides a curtain driving device, the curtain driving device includes an intermediate shaft, a mandrel, and a plane scroll spring; an outer end of the plane scroll spring is fixed to the intermediate shaft, and an inner end of the plane scroll spring is fixed to the mandrel; a torque provided by a working section of a reed of the plane scroll spring is gradually reduced from an outer ring toward an inner ring of the plane scroll spring; the working section includes a first length section and a second length section connected to an inner end of the first length section; in the first length section, the torque decreases by a first decrement value per unit length from the outer ring toward the inner ring; in the second length section, the torque decreases by a second decrement value per unit length from the outer ring toward the inner ring; the first decrement value is less than the second decrement value.

By adopting the above-mentioned technical solutions, the beneficial effects of the inventive embodiments of the present invention are at least as follows. The embodiments of the present invention divides the working section of the plane scroll spring into the first length section and the second length section, the torque provided in the first length section decreases by the first decrement value per unit length from the outer ring toward the inner ring, and the torque provided in the second length section decreases by the second decrement value per unit length from the outer ring toward the inner ring, and the first decrement value is less than the second decrement value, so that the torque distribution of the working section of the plane scroll spring is better matched with the supporting force required by the curtain body when the curtain body is lifted or lowered to different height positions, and therefore, the smooth and effective supporting force required for the curtain body can always be provided, which makes the lifting or falling of the curtain body smoother.

DETAILED DESCRIPTION OF THE INVENTION

The present application will be further described in detail below with reference to the accompanying drawings and specific embodiments. It should be understood that the following illustrative embodiments and illustrations are only used to explain the present invention and are not intended to limit the invention, and in the case of no conflict, that embodiments of the present invention and the features of the embodiments may be combined with each other.

Figure 1:
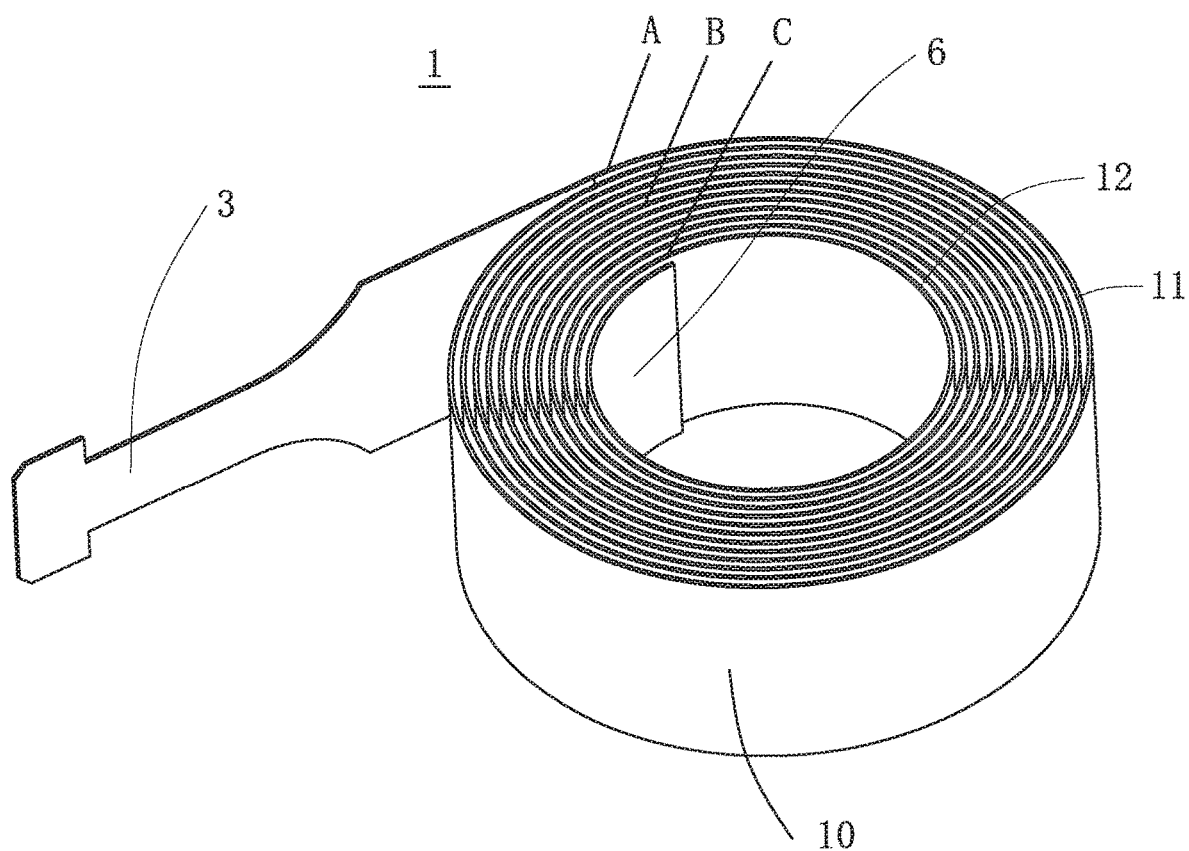
FIG. 1 is an isometric view of a plane scroll spring of an embodiment of the present invention.
Figure 2:
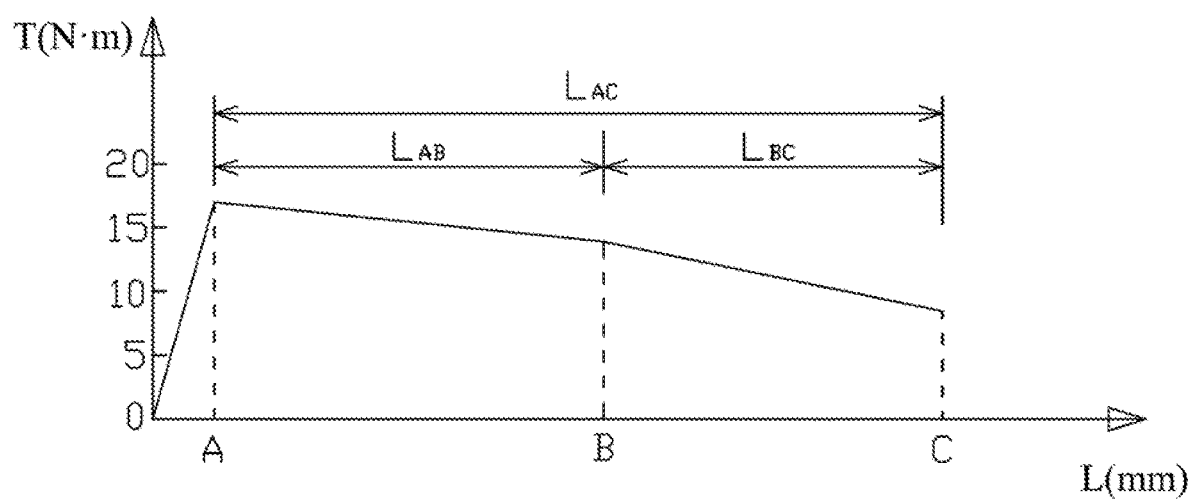
FIG. 2 is a torque distribution diagram showing the torque distribution along the length of the plane scroll spring of an embodiment of the present invention.

Referring to FIGS. 1 and 2, an embodiment of the present invention provides a plane scroll spring 1. A torque provided by the working section $L_{AC}$ of a reed 10 of the plane scroll spring 1 is gradually reduced from an outer ring 11 toward an inner ring 12. The working section includes a first length section $L_{AB}$ and a second length section $L_{BC}$ connected to an inner end of the first length section $L_{AB}$. In the first length section $L_{AB}$, the torque T decreases by a first decrement value per unit length from the outer ring 11 toward the inner ring 12. In the second length section $L_{BC}$, the torque T decreases by a second decrement value per unit length from the outer ring 11 toward the inner ring 12. The first decrement value is less than the second decrement value.

It should be understood that the working section $L_{AC}$ of the reed 10 in the present invention refers to a reed section that is subjected to force when the curtain body moves from an initial position of the full contraction of the curtain body to a maximum position of the curtain body. The outer ring 11 and the inner ring 12 mentioned in the present invention are relative concepts, that is, the outer ring 11 is relatively far from the axis of the plane scroll spring 1, and the inner ring 12 is close to the axis of the plane scroll spring 1. Taking the reed in the intermediate layer as an example, the reed in the intermediate layer is the inner ring 12 relative to the reed which is located on the outer side of the intermediate layer, and the reed in the intermediate layer is the outer ring 11 relative to the reed which is located on the inner side of the intermediate layer.

Figure 3:
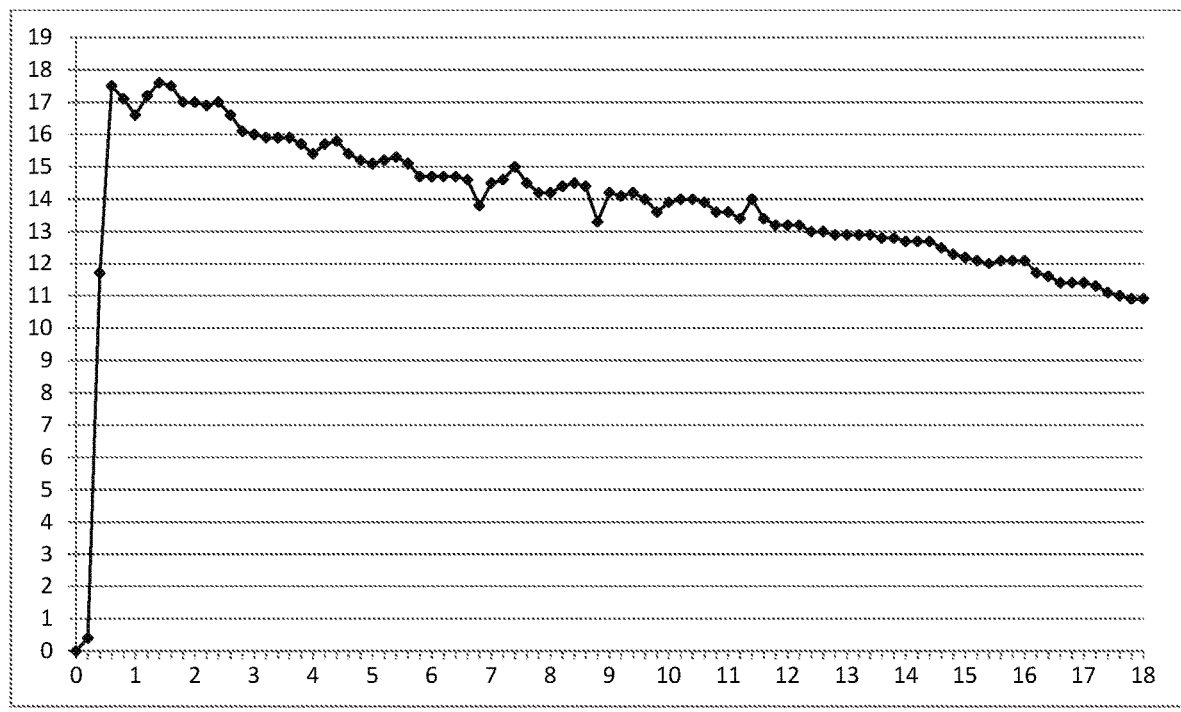
FIG. 3 is a graph showing the actual measured torque-turn relationship of an embodiment of the plane scroll spring of the present invention.

As shown in FIG. 3, it is a torque-turn relationship diagram drawn by the actual measurement of the torque of the plane scroll spring 1 provided by the embodiment of the present invention. The abscissa in the figure represents the number of turns from the outermost ring toward the inner ring. The torque is measured every 0.2 laps in actual measurement. The ordinate represents the measured value of the torque T, and the unit is N·m. Since the plane scroll spring 1 is wound in turn circle by circle, it is obvious that the length of each outer ring 11 will be greater than the length of each inner ring 12, that is, the number of turns per unit length will be sequentially increased from the outer ring 11 toward the inner ring 12. Therefore, as shown in FIG. 3, it is also found that the torque T distribution tendency along the length of the reed 10 is substantially the same as the torque T distribution tendency shown in FIG. 2.

In the embodiment, the working section $L_{AC}$ of the plane scroll spring 1 is divided into the first length section $L_{AB}$ and the second length section $L_{BC}$. In the first length section $L_{AB}$, the torque T provided decreases by the first decrement value per unit length from the outer ring 11 toward the inner ring 12. In the second length section $L_{BC}$, the torque T decreases by the second decrement value per unit length from the outer ring 11 toward the inner ring 12. The first decrement value is less than the second decrement value. Therefore, the torque T distribution of the working section $L_{AC}$ of the plane scroll spring 1 is better matched with the supporting force to be required by the curtain body when the curtain body is lifted to different height positions, so that the smooth and effective supporting force required for the curtain body can always be provided, and the lifting or falling of the curtain body is more stable.

Referring to FIG. 1, in an alternative embodiment, a starting end of the outermost reed 10 of the working section $L_{AC}$ of the plane scroll spring is provided with a flat outer fixing section 3. In a specific application, referring to FIG. 4, the outer fixing section 3 can be used for being fixed to an intermediate shaft 4 for receiving and winding the plane scroll spring 1. The outer fixing section 3 may be a structure that can fix the starting end of the outermost reed 10 of the plane spiral spring 1 to the corresponding intermediate shaft 4, such as an I-shaped piece, a T-shaped piece, or a rectangular piece defining a circular hole, and the like. The outer fixing section 3 functions as a non-working section and is designed as a straight structure, and does not generate torque itself, so that the outer fixing section 3 can be more conveniently fixed to the corresponding intermediate shaft 4, to improve the assembly efficiency of the plane scroll spring 1.

Referring to FIG. 1, in an alternative embodiment of the present invention, an inner end of the reed 10 of the innermost ring of the working section $L_{AC}$ of the plane scroll spring 1 is further provided with an inner fixing portion 6. In a specific application, referring to FIG. 4, the inner fixing portion 6 can be used for being fixed to a mandrel 5 for receiving and winding the plane scroll spring 1. The inner fixing portion 6 is constituted by one or more circular reeds having a smaller radius of curvature than the innermost reed 10 of the working section $L_{AC}$. In the embodiment, by designing the inner fixing portion 6, the plane scroll spring 1 can be conveniently wound and fixed on the corresponding mandrel 5, and the matching clearance is smaller, so as to prevent the plane scroll spring 1 from shaking during operation and improve the stability of curtains during use.

Figure 4:
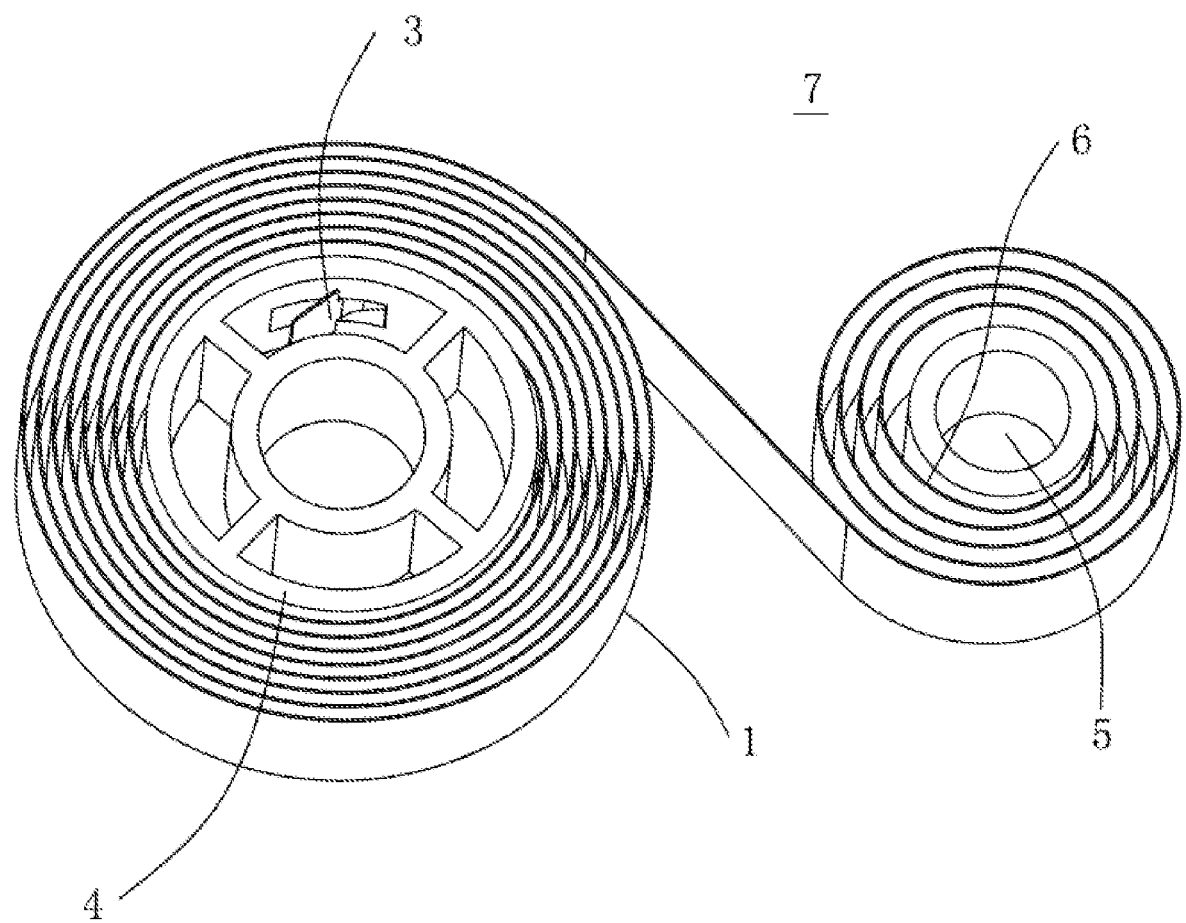
FIG. 4 is an isometric view of a curtain driving device of an embodiment of the present invention.

In another embodiment of the present invention, referring to FIG. 4, the embodiment of the present invention further provides a curtain driving device 7 including an intermediate shaft 4, a mandrel 5, and a plane scroll spring 1. The planar scroll spring 1 is similar to the plane spiral spring 1 as described above. The outer end of the plane scroll spring 1 is fixed to the intermediate shaft 4, and the inner end of the plane scroll spring 1 is fixed to the mandrel 5.

The embodiment of the present invention provides driving power by adopting the aforementioned plane scroll spring 1. The plane scroll spring 1 is connected to the reel of the drawstring through the intermediate shaft 4, to drive the reel. Since the working section $L_{AC}$ of the plane scroll spring 1 is divided into the first length section $L_{AB}$ and the second length section $L_{BC}$, the torque T provided in the first length section $L_{AB}$ decreases by the first decrement value per unit length from the outer ring 11 toward the inner ring 12, and the torque T provided in the second length section $L_{BC}$ decreases by the second decrement value per unit length from the outer ring 11 toward the inner ring 12, and the first decrement value is less than the second decrement value, the torque T distribution of the working section $L_{AC}$ of the plane scroll spring 1 is better matched with the supporting force required by the curtain body when the curtain body is lifted or lowered to different height positions. Therefore, the smooth and effective supporting force required for the curtain body can always be provided, which makes the lifting or falling of the curtain body smoother.

The specific embodiments of the present invention described above further explain the objects, technical solutions, and beneficial effects of the present invention. It should be understood that the foregoing is only illustrative of specific embodiments of the present invention, and is not intended to limit the scope of the invention. Any modifications, equivalents, improvements, etc. made within the spirit and principles of the present invention are intended to be included in the scope of the present invention.

What is claimed is:

1. A plane scroll spring, wherein a torque provided by a working section of a reed of the plane scroll spring is gradually reduced from an outer ring toward an inner ring of the plane scroll spring; the working section comprises a first length section and a second length section connected to an inner end of the first length section; wherein in the first length section, the torque decreases by a first decrement value per unit length from the outer ring toward the inner ring; wherein in the second length section, the torque decreases by a second decrement value per unit length from the outer ring toward the inner ring; the first decrement value is less than the second decrement value.

2. The plane scroll spring of claim 1, wherein a flat outer fixing section is formed on a starting end of an outermost reed of the working section.

3. The plane scroll spring of claim 1, wherein an inner fixing portion is formed on an inner end of the reed of an innermost ring of the working section.

4. A curtain driving device, comprising:
   an intermediate shaft;
   a mandrel; and
   a plane scroll spring, wherein an outer end of the plane scroll spring is fixed to the intermediate shaft, and an inner end of the plane scroll spring is fixed to the mandrel;
   wherein a torque provided by a working section of a reed of the plane scroll spring is gradually reduced from an outer ring toward an inner ring of the plane scroll spring; the working section comprises a first length section and a second length section connected to an inner end of the first length section; wherein in the first length section, the torque decreases by a first decrement value per unit length from the outer ring toward the inner ring; wherein in the second length section, the torque decreases by a second decrement value per unit length from the outer ring toward the inner ring; the first decrement value is less than the second decrement value.

5. The curtain driving device of claim 4, wherein a flat outer fixing section is formed on a starting end of an outermost reed of the working section.

6. The curtain driving device of claim 4, wherein an inner fixing portion is formed on an inner end of the reed of an innermost ring of the working section.

* * * * *